March 30, 1926. 1,578,308
C. AMEDEE-MANNHEIM
SUSPENSION FOR VEHICLES
Filed August 31, 1922
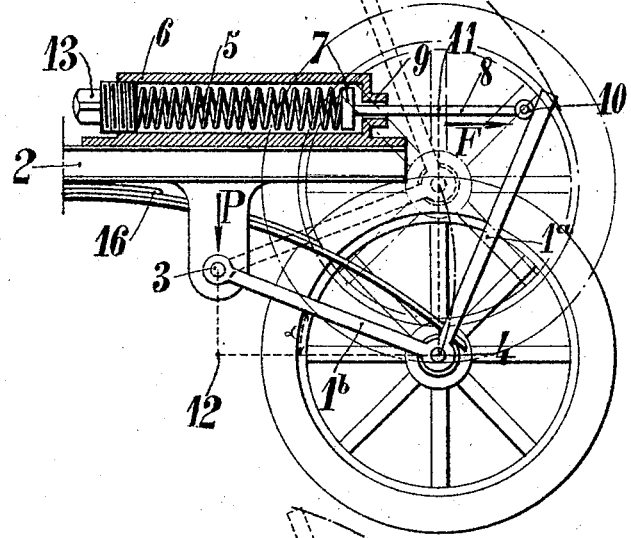
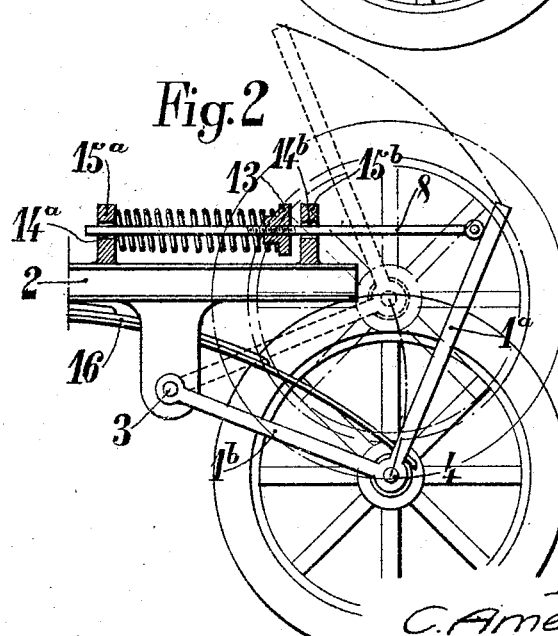
Inventor
C. Amedee-Mannheim
by Langner, Parry, Card & Langner
Att'ys.

Patented Mar. 30, 1926.

1,578,308

UNITED STATES PATENT OFFICE.

CHARLES AMEDEE-MANNHEIM, OF PARIS, FRANCE.

SUSPENSION FOR VEHICLES.

Application filed August 31, 1922. Serial No. 585,495.

*To all whom it may concern:*

Be it known that I, CHARLES AMEDEE-MANNHEIM, a citizen of the French Republic, residing 21 Boulevard Beausejour, Paris, France, have invented new and useful Improvements in a Suspension for Vehicles, of which the following is the specification.

This invention relates to a suspension for vehicles.

The invention is adapted to permit the use, for the suspension proper, of a very flexible resilient cushion. For this purpose, the devices described hereafter comprise a carrying system for supporting the frame on the axles such that, exclusively of the resilient cushion forming the suspension, the frame rests in neutral equilibrium on the axles whatever may be the variations of the distance between the frame and the axles. The resilient cushion, which constitutes the suspension proper, is therefore adapted to maintain this distance at its normal value; and consequently, it can be considerably more flexible than in ordinary suspensions in which this cushion is simultaneously used for suspension and carrying purposes and it is this which produces the increased comfort.

The accompanying drawing illustrates by way of example two forms of carrying out the invention.

Fig. 1 is a diagrammatic view of what may be termed the standard form of construction.

Fig. 2 illustrates a modification thereof.

In these figures, the frame of the vehicle is illustrated by its longitudinal bearer and it will be assumed that any point of the frame is invariably connected to this longitudinal bearer. The diagrammatic views apply to the front portion of the frame as well as to the rear portion thereof.

In the example shown in Fig. 1, a rigid angle member $1_a$—$1_b$ pivoted to the frame 2 at 3, is pivoted to the axle at 4; and a spring 5 acting by compression is contained in a horizontal cylinder 6 rigid with the frame 2 which spring bears against an abutment 7 on a rod 8, guided in a bore 9 of cylinder 6. This rod carries at its end a roller 10 pressing on the branch $1_a$ of the angle member which constitutes a raceway for this roller. It is easy to see that any shock on the axle 4 will cause the angle member to pivot about the point 3 of the frame and this will determine an increase of compression of the spring 5 at the same time as a decrease of the effective length of the lever arm at the end of which acts the force F of the spring. The spring on the one hand and the form of the branch $1_a$ of the angle member on the other hand must be chosen in such a manner that during these shocks the momentum relatively to the point 4 of the force F of the spring (that is to say $Fx4$—11) remains equal to the moment $Px4$—12 of the fraction P of the weight of the frame applied at 3. Under these conditions, the frame rests in neutral equilibrium on the axles, and the frame will not have any tendency to move upward or downward, whatever may be its distance from the axle. This device is adjustable according to the load by screwing up or unscrewing the nut 13 of the cylinder 6 on which the spring 5 takes a bearing.

The laminated steel spring 16 constitutes the flexible resilient cushion forming the suspension proper.

In the example shown in Fig. 2, the rod 8 is guided in holes $14^a$ $14^b$, provided in members $15^a$ $15^b$ rigid with the frame 2; the cylinder 6 is done away with, and the nut 13 is screwed on the rod 8 itself. The operation is obviously identical with that previously described.

What I claim as my invention and desire to secure by Letters Patent is:

1. In a suspension for vehicles, a frame, an axle, a two branched lever, a pivot connecting the end of one of the branches of the lever to the frame, a pivot connecting the lever at its middle part to the axle, a rod guided in the frame, an abutment carried by the rod, a coil spring bearing on the frame and on the abutment, a roller on the rod for contacting with the other branch of the lever, and a leaf spring interposed between the axle and the frame.

2. In a system of suspension for vehicles, a frame, an axle, a branched lever, a joint connecting the end of one of the branches of the lever to the frame, a joint connecting the lever at its middle part to the axle, a rod guided in the frame, an abutment carried by the rod, a coil spring bearing on the frame and on the abutment, a member for regulating the initial tension of the spring, a roller on the rod contacting with a second branch of the bent lever, and a leaf spring interposed between the axle and the frame.

In testimony whereof I have signed my name to this specification.

CHARLES AMEDEE-MANNHEIM.